United States Patent [19]
Gladish et al.

[11] Patent Number: 4,887,706
[45] Date of Patent: Dec. 19, 1989

[54] ACCUMULATION AND STORAGE SYSTEM FOR PALLETIZED LOADS

[75] Inventors: Herbert E. Gladish, Ottawa; Ronald C. Hallett, Pickering; Richard C. Blair, Stouffville, all of Canada

[73] Assignee: Eddy Forest Products, Ltd., Ottawa, Canada

[21] Appl. No.: 168,152

[22] Filed: Mar. 15, 1988

[30] Foreign Application Priority Data

Mar. 3, 1987 [CA] Canada .................................... 533268

[51] Int. Cl.$^4$ ............................................. B65G 25/04
[52] U.S. Cl. ................................................... 198/774
[58] Field of Search ............... 414/266, 267, 276, 277, 414/280, 282, 286, 457, 917, 749; 198/955, 457, 773, 774

[56] References Cited

U.S. PATENT DOCUMENTS

| | | | |
|---|---|---|---|
| 2,684,769 | 7/1954 | Wallerius et al. | 198/773 X |
| 3,322,259 | 5/1967 | Milazzo | 198/774 X |
| 4,071,137 | 1/1978 | Fink | 198/955 X |
| 4,109,781 | 6/1978 | Moons | 198/457 X |
| 4,304,521 | 12/1981 | Hammond | 414/286 X |
| 4,357,128 | 11/1982 | Gooden | 414/156 |
| 4,511,030 | 4/1985 | Lem | 198/955 X |
| 4,616,966 | 10/1986 | Gladish | 198/811 X |
| 4,684,311 | 8/1987 | Dickson-Wright et al. | 198/774 X |

FOREIGN PATENT DOCUMENTS

| | | |
|---|---|---|
| 2936532 | 3/1981 | Fed. Rep. of Germany . |
| 2092826 | 1/1972 | France . |
| 2391124 | 12/1978 | France . |
| 943148 | 7/1982 | U.S.S.R. .............................. 198/773 |
| 2006148 | 5/1979 | United Kingdom . |
| 1602248 | 11/1981 | United Kingdom . |

OTHER PUBLICATIONS

Brochure: "Load Bank" by Conveyor Logic.
Brochure: "Hydraroll" by Hydroroll Limited.

Primary Examiner—Andres Kashnikow
Assistant Examiner—Kevin P. Weldon
Attorney, Agent, or Firm—Jones, Tullar & Cooper

[57] ABSTRACT

An accumulation and storage system, preferably for palletized loads, utilizes a SAILRAIL (trade mark) air support system for guiding and supporting an elongated deck during reciprocal movement thereof. Alongside each edge of the deck is a pallet lifting/lowering mechanism which uses an elongated inflatable tube, such as a fire hose, to raise or lower an inverted U-shaped lifting member. When the lifting members are raised a pallet can be placed thereon and the deck can reciprocate therebelow. When the lifting members are lowered the pallet rests on the deck and can be moved along the system to a subsequent position where it is raised clear of the deck so that the deck can return to pick up another pallet at the input station. Logic controls can be used to operate the system quickly, efficiently and automatically.

2 Claims, 3 Drawing Sheets

ACCUMULATION AND STORAGE SYSTEM FOR PALLETIZED LOADS

The present invention relates to an accumulation and storage system for palletized loads.

BACKGROUND OF THE INVENTION

Manufacturing, warehousing and large retail businesses are always faced with the problem of moving and storing their inventory, whether for a short period of time before shipping or for longer periods of time prior to usage or sale. Furthermore, many manufacturing concerns, particularly in the automotive industry, now operate on the "just-in-time" principle, which means that component parts from other parts of the plant or from outside suppliers are delivered to an assembly area with minimal storage flow just before they are to be used. No matter how a business operates, if it accumulates, stores or uses inventory it will be faced with the problem of moving and storing that inventory and of ensuring that the inventory is retrieved and used in the correct sequence. Computerized inventory control is now the norm, especially in "just-in-time" manufacturing situations and it is now essential that any system in which inventory is to be placed be adaptable to computer control. It is also essential that inventory storage and retrieval systems be economical to purchase and operate.

SUMMARY OF THE INVENTION

The present invention provides an accumulation and/or storage system for inventory that fulfills the various requirements enumerated above. It utilizes a basic transport system that can move and/or accumulate palletized loads in an organized travel route for either FIFO (First In First Out) or FILO (First In Last Out) operation, can be computer controlled, is economical to produce and to operate, and can be expanded horizontally and/or vertically to create a high density accumulation, storage and retrieval system that is highly efficient.

In its broadest form the present invention provides a pallet moving and accumulation system for palletized loads comprising: (a) elongated deck support means; (b) elongated deck means including means coacting with the support means to support and guide the deck means for reciprocal movement relative thereto; (c) drive means connected to the deck means for reciprocally moving the deck means between first and second positions; and (d) pallet moving means on each side of the deck means for lifting pallets in the system away from the deck means to permit the deck means from the second position to the first position and for lowering pallets in the system onto the deck means for movement therewith as the deck means moves from the first position to the second position.

Usually the pallet moving and accumulation system will entail a framework or base in or on which the deck support means will be mounted. Those support means could be roller or ball-type conveyors but preferably they will entail SAILRAIL (trade mark of E. B. Eddy Forest Products Ltd.) air film support components. For example the support means could entail a pair of extruded aluminum rails each having a concave upper surface and interior full length ports. Small (0.66 mm) diameter angled nozzles drilled at 45 degrees to the track surface extend through the track surface into the internal air supply. The coacting means of the system can entail elongated, somewhat oval-shaped runners positioned between the deck means and the rail. When the system is operating, pressurized air at about 25 psi is admitted by control valves into the center air supply and air jets from each nozzle at high velocity to provide a thin air film between the runner and rail surface whereby the runner can move along the rail very easily, being guided and supported by the rail and the air film.

The deck means can involve a sturdy deck or platform bolted to a central channel tie member or it could involve an open grid or a series of transversely interconnected shapes. The deck must be able to mount the runners which coact with the concave rails (in a SAILRAIL support system) or any other coacting means which operate in conjunction with the deck support means; it must be narrower than the pallets carried thereby; and its length is at least one load position less than the full length of the storage or conveyor lane, to allow for a full load position reciprocating movement.

The drive means can involve any mechanism which will impart reciprocal movement to the deck means. Since the deck can be carrying a substantial load, the drive means must be able to impart initial acceleration to a fully loaded deck and to decelerate the deck to a fully stopped condition at the end of a precise travel distance. The requirement for a strong drive means is substantially reduced with a SAILRAIL support system due to the almost frictionless interface between the runner and the rail created by the thin air film. Preferably the drive means will entail at least one long stroke hydraulic or pneumatic cylinder, having suitable end stroke cushion features, attached to the deck. Alternative drive means could include a reversible electric motor driving a rack and pinion set or a sprocket and chain assembly, a friction wheel engaging either the deck or the "ground" or even a linear motor.

The pallet moving means are typically situated outboard of the deck supports and underlie the portions of pallets that extend outwardly beyond the edges of the narrower deck. When, for example, a pallet is placed on the deck the moving means are retracted so that movement of the deck will result in movement of the pallet and its load therewith. At the end of its travel the deck stops and the pallet moving means are operated to elevate the pallet clear of the deck so that the deck can retract back to its load position. As another load is placed on the deck the pallet moving means lower the previously elevated pallet(s) to the deck so that forward movement of the deck will result in forward movement of pallets thereon. The pallet moving means can extend the full lane length whereby all pallets therein are raised or lowered together or the moving means can be provided in sections as short as a pallet length whereby all pallets or only selected ones thereof are raised or lowered as desired.

Preferably the pallet moving means will include an elongated generally rectangular support member alongside each deck support and positioned below the area of pallet overhang. Each support member carries a full length of air or fluid expandable tubing such as a fire hose. Over the hose and support member is placed a vertically guided inverted U-shaped or H-shaped member so that when the air hose is pressurized it will operate on the vertically guided member to bring it into contact with a pallet and to lift the pallet clear of the deck. When the air is exhausted from the hose the vertically guided member is lowered to below deck level, thus transferring the pallet(s) to the deck for movement therewith.

Other types of moving means could be used with the invention, as will be discussed hereinafter.

The system of the present invention lends itself to horizontal and/or vertical expansion to achieve pallet movement in a high density storage and retrieval system. Appropriate transfer mechanisms can be provided at each lane end to move pallets horizontally or on an incline or decline to any selected adjacent lane and elevating means can also be provided to move loads vertically to a selected elevated lane. All lanes would operate on the same principles as the basic invention.

The present invention will now be described in greater detail and with reference to the drawings identified below.

DESCRIPTION OF THE PREFERRED EMBODIMENT

Figure 1:
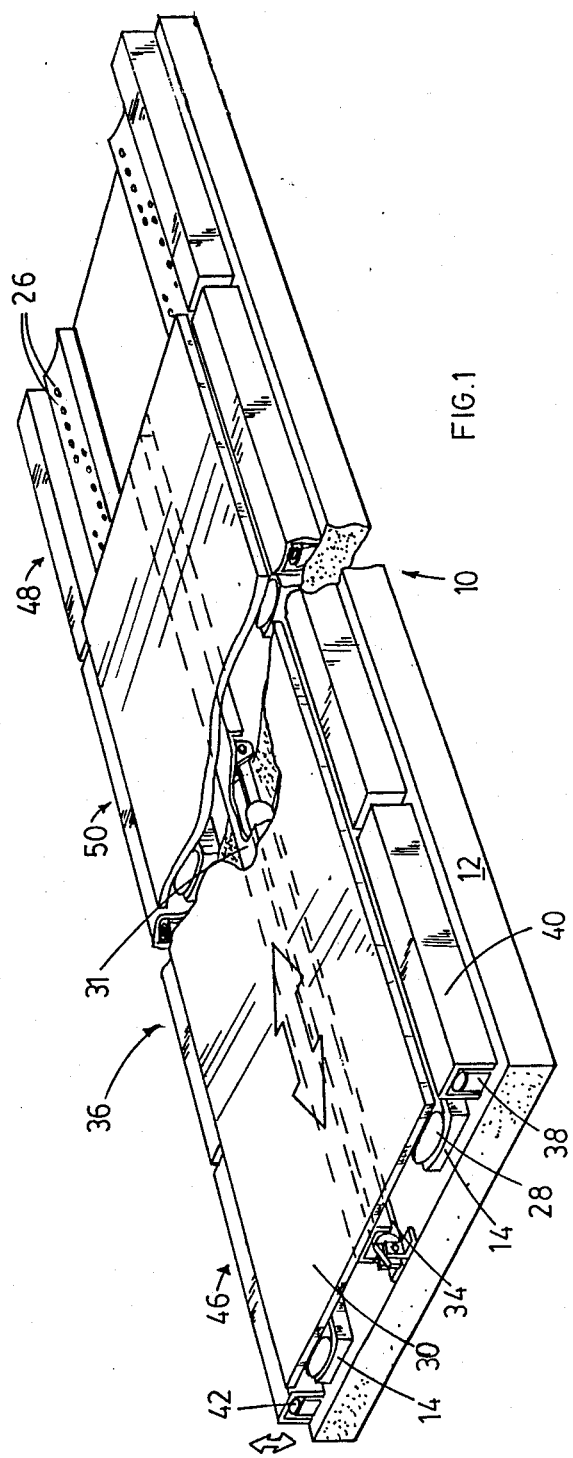
FIG. 1 is a perspective view showing the basic configuration of the present invention.

FIG. 1 illustrates, in perspective, the basic pallet moving and accumulation system 10 of this invention. As shown, the system is assembled on a base 12, which could be the concrete floor of a warehouse, factory or other building, or which could be part of the framework of a storage racking system. The base 12 is intended to represent an appropriate mounting support of a length and width appropriate to the loads to carried by the system.

Figures 2, 3:
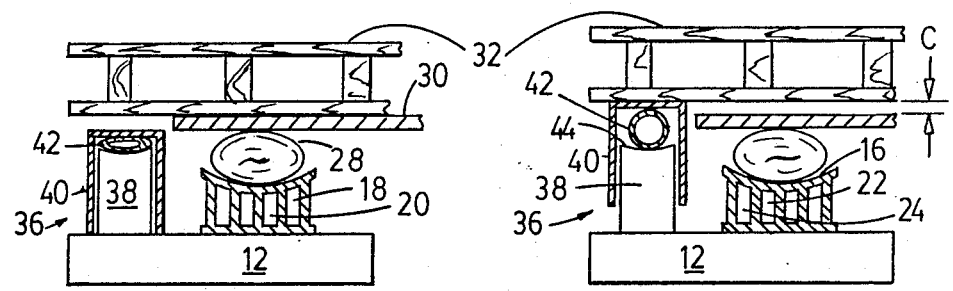
FIG. 2 is an end view of the FIG. 1 configuration with the pallet load resting on the deck.
FIG. 3 is an end view of the FIG. 1 configuration with the pallet raised clear of the deck.

Mounted on the base 12 is a pair of transversely spaced apart rails 14,14 of a SAILRAIL (trade mark) air conveyor system. As seen in FIGS. 2 and 3 the rails 14,14 include a concave upper surface 16 and a plurality of longitudinally extending ports 18,20,22,24. Nozzles 26 (see FIG. 1) extend through the surface 16 and communicate with selected ones of the ports 20,22, so that air under pressure within a rail can exit through selected nozzles 26. Pressurization of the ports can be controlled with suitable valves and logic circuits so that specific nozzles or groups thereof can be activated when necessary so as to economize on power usage and maintain noise at a minimum.

Riding on each rail is a "runner" 28, the other major component of a SAILRAIL system. Each runner includes an outer covering of polyethylene and a compliant inner filler material and, when the nozzles 26 are pressurized, an air film is generated and the runners 28 will lift slightly above the surface 16 for smooth and easy movement along the rails, supported by this thin film of low pressure air. The technology of the SAILRAIL system has been documented in several patents, including Canadian patents 950,853; 1,002,565; 1,066,645 and 1,167,797 and need not be further described herein.

The runners support thereon a deck 30 which may be of plywood or other sturdy material and is attached to a central connector 31. The deck is narrower than the load to be carried thereby and has a length which is shorter than the rails 14 by at least the length of one load movement, typically slightly more than the length of a pallet such as 32 shown in FIGS. 2 and 3. A pneumatic or hydraulic long stroke cylinder 34 with end cushion features is connected at one end to the base 12 and at the other end to the connector 31 to impart reciprocal movement to the deck and runners when the rails 14 are pressurized. The length of movement of the deck 30 should be slightly greater than one load unit although multiples of this are possible. It should also be borne in mind that the runners 28 need not extend for the entire length of the deck 30. Instead, a plurality of short runners could be longitudinally spaced apart along the length of the deck.

A pallet lifting mechanism 36 is provided along each outboard edge of the deck, that mechanism being best shown in FIGS. 2 and 3. Therein it is seen that the mechanism 36 includes a rectangular support member 38, a vertically guided inverted U-shaped or H-shaped lifting member 40 and an inflatable tube member 42 positioned between the support member 38 and the lifting member 40. Typically, the tube member 42 can be a 2½ inch fire hose. Furthermore, the upper surface of the support member 38 can be provided with a longitudinally extending recess 44 therein to help locate the tube member when it has expanded. The upper portion of the vertical lifting member can be provided with extended guides to provide transverse location of pallet legs or other similar protrusions.

As illustrated in FIG. 1, the lifting mechanism 36 of a typical system is preferably provided as three discrete sections, the input and output stations 46,48 each being one load unit in length and the longer intermediate section 50 being at least one load unit less in length than the rails 14.

The operation of the basic system will now be described for a simple task of moving loads along the length of the system, starting with an empty system.

The operation should start with the lifting members 40 in the raised position of FIG. 3, that is with all of the tube members 42 inflated. A loaded pallet 32 is placed on the lifting members 40 of the input station 46, above the deck 30, so that the deck can be drawn back to its initial position of FIG. 1. The lifting members 40 are then lowered so that the pallet rests on deck 30 clear of the members 40; the rails 14 are pressurized; and the cylinder 34 is actuated to move the deck and its load along the rails by one load unit position. At the end of the deck's travel, the lifting members 40 of the intermediate section are raised to lift the pallet 32 and its load away from the deck 30 thereby permitting the deck to retract freely therebelow towards the input station. If another load is placed on the lifting members 40 of the input station 46 the deck can return to its initial position and then accept both the new load and the first load when the lifting members 40 of the input station and the intermediate section are lowered, so that both loads can then be indexed along the system as the deck is advanced. This process can be carried out several times until the complete system has been filled, with a load unit at the output station 48, an appropriate number of units accumulated on the intermediate section 50 and, possibly, a single unit at the input station 46.

As indicated previously, suitable control circuitry can be provided to have the system operate in any desired fashion. For example, the system could automatically advance all load units upon detection of a unit being removed from the output station 48, thereby ensuring that there is always a load unit (eg., a supply of parts) at the output station (eg., a worker's assembly station). Also the control could advance the first load unit all of the way to the output station in a series of discrete advancing steps involving lowering, advancing, lifting and returning movements of the lifting members and the deck. The intermediate section could also involve a plurality of discrete lifting sections of a load unit in length, each being individually operable so that the deck could reciprocate below previously positioned load units without moving such load units while still advancing new units coming on stream at the input station 46.

Figure 4:
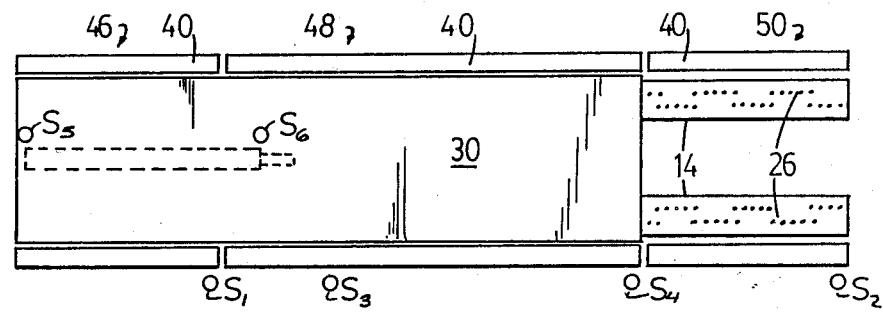
FIG. 4 is a plan view of the basic system illustrating typical positions for logic control switches or sensors.
Figure 5:
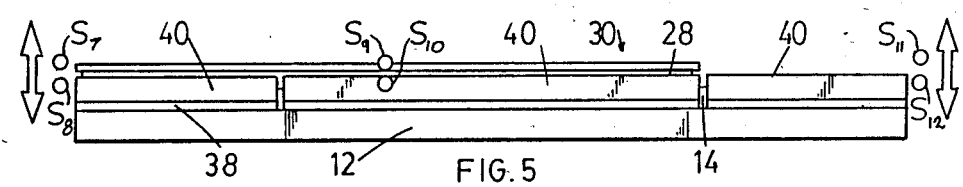
FIG. 5 is an elevational view showing typical positions for additional logic control switches or sensors.

Control of the system can be through pneumatic or electronic logic circuitry with the various functions being initiated or terminated in response to inputs from various actuators such as switches or sensors positioned within the system at specific decision points. With reference to FIGS. 4 and 5 it can be seen that full control can be achieved with just twelve switches or sensors, S1 to S12. Switch S1 will sense when a load unit is placed at the input station 46 and switch S2 will detect the presence of a load unit at the output station 48. Switch S3 will detect the presence of a load unit at the first position of the intermediate section 50 and switch S4 will detect the presence of a load unit at the last position of the intermediate section. Switches S5 and S6 detect when the cylinder 34 is retracted or extended respectively; and switches S7, S8; S9, S10; and S11, S12 detect when the lifting members 40 of the input station, the intermediate section, and the output station respectively are in the raised or lowered condition. A pallet actuating any of the switches S1 to S4 will prompt the logic circuit to either raise or lower the appropriate lifting members or to actuate the cylinder 34 to move the deck in the desired direction so as to achieve the desired movement of one, several or all pallets residing in the system while maintaining a count of the number of loads moved into and out of the system. The circuitry used will depend on the flow of pallets required for the individual application and is well within the capabilities of a competent engineer and need not be described in detail herein.

Figures 6, 7:
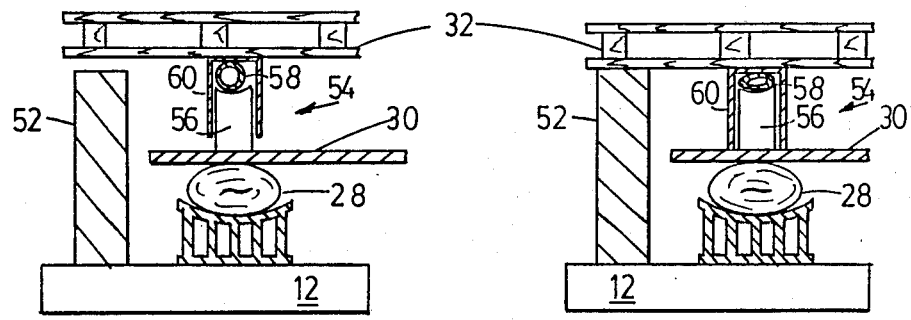
FIGS. 6 and 7 are similar to FIGS. 2 and 3 and illustrate end views of a second embodiment of this invention.

FIGS. 6 and 7 illustrate an alternative embodiment wherein the pallet lifting means is provided on the deck 30 itself. In this case a pallet support 52 extends the length of the system outboard of the deck 30, support 52 being higher than the deck surface. Pallet lifting means 54 is provided on top of the deck 30 and, as in the previous embodiment, it includes a support member 56, a tube member 58 and an inverted U-shaped or an H-shaped lifting member 60. Inflation of the tube member 58 as seen in FIG. 6 will lift a pallet 32, previously resting on supports 52 (FIG. 7), away from the supports 52 for movement along the system as the deck 30 is moved. When the tube member 58 is deflated there is a gap between the underside of any pallets 32 resting on members 52 and the top of lifting members 60 to permit unimpeded reciprocation of deck 30 therebelow. The accumulation of pallets and the movement thereof through the system would be the same as, or at least analogous to, that of the first embodiment.

While not specifically illustrated in the drawings it is clear that other configurations or components can be associated with this invention. For example, different deck support means such as roller or ball conveyors or an air bearing pad could be used in place of the preferred SAILRAIL support system. Such means, however, would not be as efficient, cost effective or quiet. The drive means for the deck could be a suitably engineered linear motor, a so-called "rodless" cylinder, a reversible rack-and-pinion gear set; or a reversible sprocket and chain mechanism. A pulse pump could be a suitable means for hydraulically reciprocating the deck. The pallet moving means could entail eccentrically driven rollers lifting or lowering a lifting member or a pair of cooperating wedge members which raise or lower a pallet as they are moved together or apart. The deck could be solid (eg., plywood); it could be an open grid-like platform; or it could entail a plurality of widely spaced apart deck sections suitably joined together for conjoint movement.

The basic system or configuration described herein could be part of a larger warehousing layout with directional changes at the output end taking a load to a specific work station as desired. Pallets could be directed to adjacent horizontal lanes to create a serpentine flow path or an elevating means could move pallets upwardly or downwardly to different levels of a racking system to make use of free vertical space in a warehouse or factory. Any combination of vertical and horizontal direction changes could be used to direct loads in any desired pattern. Clearly the system of the present invention provides a very versatile load-handling system readily adaptable to practically any situation.

One particular type of warehousing is amenable to improvement with the system of this invention, namely "bulk" warehousing. Typically, "bulk" warehousing can make maximum utilization of available floor space of only 50%. By covering almost the entire floor area with adjacent systems of the present invention it is possible to increase space utilization substantially. Loads on pallets carried by the decks of the present system can reach almost to the ceiling of the warehouse without worry that they will topple since the reciprocating movement applied thereto is extremely smooth and since the lifting distance is extremely small, just enough to provide enough clearance for deck movement.

Figure 8:
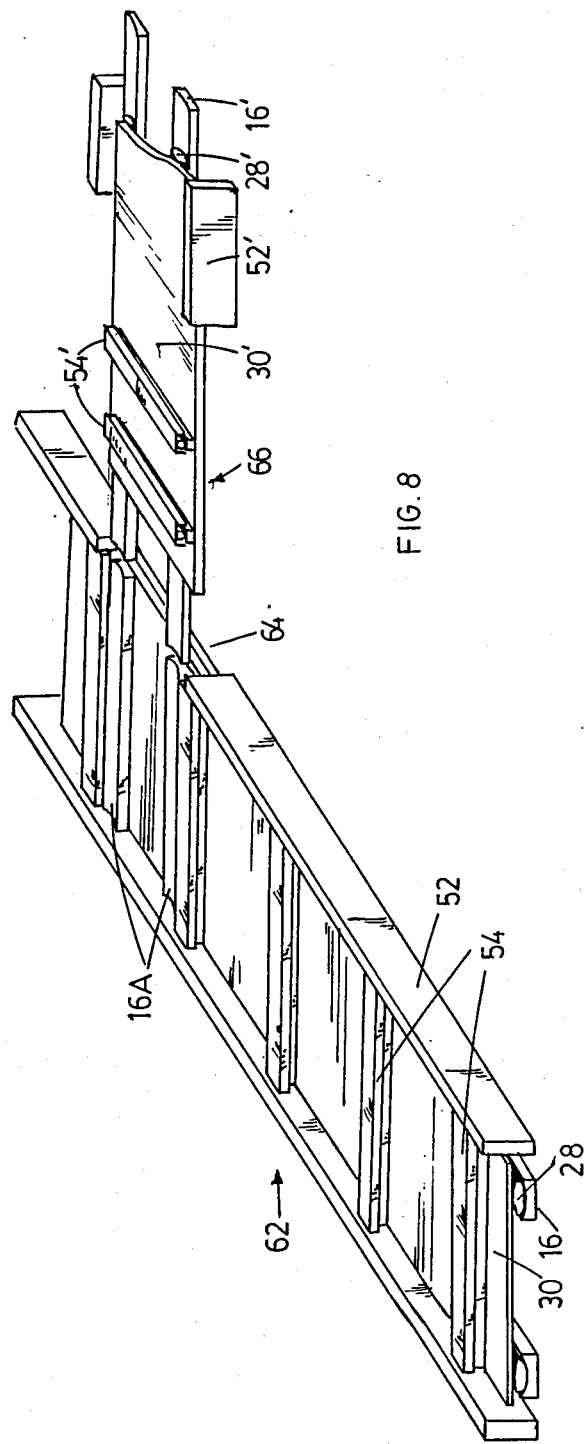
FIG. 8 shows a configuration for moving loads from one accumulation conveyor to another.

FIG. 8 shows one way in which load units or pallets can be transferred from one accumulation system to another. In this case a main run 62 includes supports 52, a deck 30, rails 16 and runners 28. Pallet lifting means 54 as described for FIGS. 6 and 7 are also provided on the reciprocable deck 30.

An opening 64 in one support member 52 provides access to the main run 62 for a transverse run 66 which includes support members 52', deck 30', rails 16', runners 28' and pallet lifting means 54'. Deck 30 carries auxiliary rails 16A thereon between a pair of lifting means 54 so that such rails are alignable with the rails 16' of transverse run 66 when it is desired to transfer a pallet from one run to the other. Although not shown, means can be provided to pressurize the rails 16A at the desired time.

The transfer operation would work as follows, assuming that a pallet is to be transferred from run 66 to main run 62. The lifting means 54' would first of all be operated to elevate the pallet above the support members 52' so that movement of deck 30' can advance the pallet towards the main run 62. When the pallet is adjacent the opening 64 the deck 30 is moved to align the rails 16A with the rails 16' and the deck 30' is advanced through the opening 64 onto the rails 16A. Once in position with the pallet still raised, now above the rails 52, the lifting means 54' are lowered to lower the pallet onto the support members 52 and the deck 30' is then withdrawn through the opening 64. The pallet can now be moved along the main run as desired and as described previously.

Further alterations to the present invention are within the scope of a skilled practitioner and thus the protection to be afforded this invention is to be determined from the claims appended hereto.

The embodiments of the invention in which an exclusive property or privilege is claimed are defined as follows:

1. A system for transferring palletized loads from a first accumulation system to a second accumulation system, each of said accumulation systems including:
   (a) elongated deck support means;
   (b) elongated deck means including means coacting with said support means to support and guide said deck means for reciprocal movement relative thereto;
   (c) drive means connected to said deck means for reciprocally moving said deck means between first and second positions; and
   (d) pallet moving means including an elongated pallet support member extending alongside each edge of said deck means and projecting thereabove, a plurality of tube support members extending transversely on said deck means and spaced apart therealong, inflatable tube means on each of said tube support members, a downwardly open elongated lifting member covering each said tube means and tube support member, and pressurizing means for selectively inflating said tube means to lift said lifting members into lifting engagement with pallets resting on said pallet support members for movement with said deck means as said deck means moves from said first position to said second position or for selectively deflating said tube means for lowering any pallets previously lifted by said pallet moving means to rest on said pallet support means to permit said deck means to move from said second position to said first position below such lowered pallets;

said transferring system comprising: an opening in one pallet support member of said second accumulation system, said first accumulation system being at right angles to said second system at said opening; and deck support means carried by the deck means of said second system between a pair of the tube support members thereof and alignable with the deck support means of said first system at said opening; said first system deck means at the second position thereof overlying said second system deck means at the first position thereof.

2. The system of claim 1, wherein said deck support means and said coacting means comprise, respectively, a pair of parallel rails extending the length of said system and a plurality of compliant runners positioned between said deck means and said rails, said rails and runners being part of an air support system.

* * * * *